United States Patent [19]

Milani et al.

[11] Patent Number: 5,348,925
[45] Date of Patent: Sep. 20, 1994

[54] CATALYST FOR THE POLYMERIZATION OF OLEFINS

[75] Inventors: Federico Milani, Santa Maria Maddalena; Luciano Luciani, Ferrara; Antonio Labianco, Stienta, all of Italy

[73] Assignee: ECP Enichem Polimeri S.r.l., Milan, Italy

[21] Appl. No.: 20,990

[22] Filed: Feb. 22, 1993

[30] Foreign Application Priority Data

Feb. 26, 1992 [IT] Italy .................. MI.92-A/000414

[51] Int. Cl.$^5$ ............................................... B01J 31/00
[52] U.S. Cl. ........................... 502/115; 502/119; 502/120; 502/131; 526/114; 526/116; 526/127; 526/133; 526/137; 526/139; 526/140; 526/141; 526/142
[58] Field of Search ................ 502/115, 119, 120, 131

[56] References Cited

U.S. PATENT DOCUMENTS

| | | | |
|---|---|---|---|
| 4,252,670 | 2/1981 | Caunt et al. | 526/125 |
| 4,301,029 | 11/1981 | Caunt et al. | 502/127 |
| 4,471,066 | 9/1984 | Sakurai et al. | 502/121 |
| 5,006,620 | 4/1991 | Zolk et al. | 502/125 |

*Primary Examiner*—Asok Pal
*Attorney, Agent, or Firm*—Rogers & Wells

[57] ABSTRACT

A solid component of catalyst, active in the polymerization of propylene and other $\alpha$-olefins in stereoregular polymers, is obtained:

(i) by treating a non-activated silica support in particles with a tin tetrahalide, to at least partially block the hydroxylic groups of the silica and to obtain a blocked silica;

(ii) by impregnating the blocked silica with magnesium dialkyl or magnesium alkyl halide to make the magnesium compound react with the tin compound and with possible residual hydroxylic groups of the silica and to obtain a support;

(iii) by halogenating the support by contact with a halogenating agent selected from the halides of tin, antimonium or silicon to obtain a halogenated support;

(iv) by titanating the halogenated support with an excess of a titanium tetrahalide to obtain a titanated support;

(v) by putting the titanated support in contact with a Lewis base, to obtain a solid component of catalyst.

20 Claims, No Drawings

CATALYST FOR THE POLYMERIZATION OF OLEFINS

The present invention relates to a process for the production of a component of catalyst for the polymerization of α-olefins, the catalyst which incorporates the component thus obtained and a process for the polymerization of α-olefins which uses this catalyst.

Olefinic monomers such as ethylene, propylene and higher α-olefins can be polymerized by using Ziegler-Natta-type catalysts, i.e. catalytic systems obtained by the combination of an organometallic compound of elements from groups IA to IIIA and a compound of a transition metal belonging to groups IVA to VIA of the periodic table (Boor Jr., "Ziegler-Natta Catalysts and Polymerization", Academic, New York, 1979).

When these catalysts are used in the polymerization of propylene and higher α-olefins a mixture of isotactic and atactic polymer is formed, the isotactic polymer being the more commercially valuable material. The first problem consequently consists in directing the polymerization of the olefin towards the prevalent or exclusive formation of the isotactic polymer. A further problem consists in reducing the content of catalytic residues in the polymer finally obtained to levels which are lower than those that cause harmful effects in the subsequent processing and transformation phases.

Various proposals have been made in the art for improving the stereospecificity and activity of the catalytic system. These proposals are generally based on the modification of the components of the catalytic system by introducing other components and typically Lewis bases and on the use of a support for the transition metal, and typically a halide of a bivalent metal.

Hence according to the description of U.S. Pat. No. 4,252,670, a component of catalyst for the polymerization of olefins is obtained by treating an organic compound of magnesium with a halogenating agent, and adding a Lewis base and titanium tetrachloride to the reaction product thus obtained. According to the description of U.S. Pat. No. 5,006,620 a component of catalyst for the polymerization of olefins is obtained by treating a silica, in following order, with an organic compound of magnesium, a gaseous chlorinating agent selected from chlorine and hydrochloric acid, a derivative of phthalic acid, a $C_1$-$C_8$ alkanol and titanium tetrachloride.

It has now been found, in accordance with the present invention, that a non-activated silica can be interacted with a tin tetrahalide under conditions which enable the blocking of the hydroxyls present in the silica. It has also been found that this blocked silica is suitable for forming a catalyst support by the deposition of an organic compound of magnesium and subsequent halogenation with a metallic halide. It has finally been found that the support thus obtained can be interacted with a titanium tetrahalide and with particular Lewis bases, to give, both simply and economically, a solid component of catalyst which is highly active in the polymerization of α-olefins in stereoregular polymers.

In accordance with this, the present invention relates to a procedure for the preparation of a solid component of catalyst, active in the polymerization of propylene and other α-olefins to stereoregular polymers, containing silica, magnesium, halogen, titanium and a Lewis base, said procedure being characterized in that it includes:

(i) treatment of a non-activated silica support in particles, by contact of said silica with a solution, in an inert hydrocarbon solvent, of a tin tetrahalide, operating with a weight ratio between the tin tetrahalide and the silica of between 1:1 and 20:1, at a temperature ranging from $-30°$ C. to $30°$ C., for a time which is sufficient to at least partially block the hydroxylic groups of the silica, to obtain a blocked silica;

(ii) the impregnation of said blocked silica with a solution, in an inert hydrocarbon solvent, of a magnesium dialkyl or magnesium alkyl halide, operating with a weight ratio between the magnesium compound and the blocked silica of 0.1:1 to 10:1, at a temperature ranging from $20°$ C. to the boiling point of the liquid phase, for a time which is sufficient to make the magnesium compound interact with the tin compound and with any possible residual hydroxylic groups of the silica, to obtain a support;

(iii) the halogenation of said support by contact with a solution, in an inert hydrocarbon solvent, of a halogenating agent selected from the halides of tin, antimonium or silicon, operating with a molar ratio between the halogenating agent and the magnesium compound introduced in step (ii) ranging from 0.1:1 to 100:1, at a temperature ranging from $-30°$ to $100°$ C. and for a period of 0.5 to 5.0 hours, to obtain a halogenated support;

(iv) the titanation of said halogenated support by contact of said halogenated support with an excess of a titanium tetrahalide either liquid or in solution in an inert hydrocarbon solvent, operating at a temperature ranging from $20°$ to $120°$ C. and for a period of 0.5 to 5.0 hours, to obtain a titanated support;

(v) contact of said titanated support with a Lewis base, liquid or in solution in an inert hydrocarbon solvent, operating with a molar ratio between said Lewis base and the magnesium compound introduced in step (ii) ranging from 0.05:1 to 0.5:1, at a temperature ranging from $80°$ to $120°$ C. and for a period of 0.5 to 5.0 hours, to obtain a solid component of catalyst; and (vi) the recovery of said solid component of catalyst from the reaction products of step (v).

The non-activated silica, which can be used in accordance with the present invention, is preferably a microspheroidal, porous silica, with a particle size ranging from 20 to 100 μm, with a surface area of 150 to 400 $m^2/g$, with a pore volume of 1.3 to 1.8 ml/g and with an average pore diameter of 20 to 30 Å (angstrom). This silica is one which has not been pre-activated and consequently contains hydroxyls and water in a total quantity which is generally higher than 1% by weight up to a maximum value of about 5% by weight.

In step (i) of the process according to the present invention it is preferable to operate with tin tetrachloride, at a temperature increasing from about $-20°$ C. to room temperature ($20°$-$25°$ C.) for a period of 1 to 3 hours. More specifically in practice this step is carried out by suspending the non-activated silica in an inert hydrocarbon solvent, such as for example pentane, isopentane, hexane, heptane and octane and cooling the suspension to a temperature of about $-20°$ C. A tin tetrahalide is added to the cooled, stirred suspension. At the end of the addition the suspension is kept under stirring for about 1 hour at $-20°$ C., for a further hour at $0°$ C. and the temperature is then left to rise to room values ($20°$-$25°$ C.) and the suspension is stirred at this temperature for a further hour. A blocked silica is thus obtained which is separated from the liquid, for example by decanting, by filtration or centrifugation and washed with a hydrocarbon solvent, such as pentane or hexane.

In step (i) of the process of the present invention the tin tetrahalide interacts with the hydroxyls and water contained in the silica, or partly reacts and is partly absorbed in the silica itself. In any case at the end of step (i) a blocked silica is obtained which can be used in the preparation of active and stereospecific catalysts in the polymerization of α-olefins. It should be pointed out that in this step the use of tin halide is critical, in that the use of similar halides, such as the halides of antimonium and silicon, produces catalysts which are much less active and having a low stereospecificity. Typically, in the case of polypropylene, the yield of polymer is reduced to about a third and the isotactic index values decrease from values of about 95% to values of about 80% when, under the same conditions, a silicon halide or antimonium halide is used instead of a tin halide.

The blocked silica, obtained in step (i), is impregnated with a solution, in an inert hydrocarbon solvent, of a magnesium dialkyl or magnesium alkyl halide. Compounds of magnesium suitable for the purpose are those defined by the formulae MgRR' or MgR''X, wherein R, R' and R'' each independently represent an alkyl group, linear or branched, containing from 1 to 12 carbon atoms and X represents a halogen atom and preferably chlorine. Specific examples are magnesium diethyl, magnesium ethyl butyl, magnesium dihexyl, magnesium butyl octyl and magnesium dioctyl and the corresponding chloroderivatives. Examples of inert hydrocarbon solvents suitable for the purpose are aliphatic hydrocarbon solvents such as pentane, isopentane, hexane, heptane and octane. In step (ii) of the procedure it is preferable to operate with a weight ratio between the magnesium compound and silica ranging from 0.2:1 to 2.0:1, with optimum values of about 1.0:1–1.5:1, at a temperature equal or close to room temperature (20°–25° C.) and with times of about 0.5 hours. A catalyst support is thus obtained which is separated from the suspension, for example by sedimentation, filtration or centrifugation and is washed with an inert solvent, such as a liquid aliphatic hydrocarbon and possibly dried.

In step (ii) of the process the magnesium compound interacts with the tin halide, bound to the silica or even absorbed in the silica, and with the possible unaltered hydroxyls present at the end of step (i) of the procedure also interact. It has been found that, as a result of this interaction, a solid product is formed composed of a halide, typically magnesium chloride in crystalline forms α and δ, as well as a solid of an unknown kind, in a ratio between each other which depends on the ratio between tin halide and magnesium compound. This solid product has proved to be highly active in the halogenation step which follows.

The catalyst support, obtained in step (ii), is halogenated by contact with a solution, in an inert hydrocarbon solvent, of a halogenating agent selected from the halides of tin, antimonium and silicon. It is preferable to use for the purpose tin tetrachloride, antimonium pentachloride and silicon tetrachloride. Chlorosilanes, such as trichlorosilane, vinyl trichlorosilane, trichloroethoxy silane and chloroethyl trichlorosilane, may also be used for the purpose. When a tin or antimonium halide is used, it is convenient to operate at temperatures within the range of −30° to 70° C., whereas in halogenation with a silicon halide the most suitable temperatures range from 40° to 100° C. In the preferred embodiment the molar ratio between the halogenating agent and the magnesium compound ranges from 1:1 to 20:1 for times of about 1–2 hours. The inert hydrocarbon solvents suitable for the purpose are aliphatic hydrocarbon solvents such as pentane, isopentane, hexane, heptane and octane. At the end of the halogenation treatment the solid is separated from the suspension, for example, by sedimentation, by filtration or centrifugation and is washed with a solvent, such as a liquid aliphatic hydrocarbon solvent and possibly dried.

In step (iii) of the process there is an interaction between the halogenating agent and the magnesium compound with the presumed formation of alkylated derivatives of tin, antimonium or silicon, as well as aggregates of a polymeric nature, with an unknown structure, which are however highly reactive in the titanation step which follows.

The halogenated catalyst support of step (iii) is titanated in step (iv) of the process, by contact with a titanium halide either liquid or in solution in an inert hydrocarbon solvent. Inert hydrocarbon solvents suitable for the purpose are aliphatic hydrocarbon solvents such as pentane, isopentane, hexane, heptane and octane. It is preferable to use titanium tetrachloride and to operate without a solvent. In the preferred form of practical use, the operating temperature ranges from 80° to 100° C. for periods of about 1–2 hours, to obtain a titanated support having from 3 to 7% by weight of titanium. If necessary, the titanation phase can be repeated once or several times, until the desired quantity of titanium has been fixed. At the end of the titanation treatment the solid is separated from the suspension, for example by sedimentation, by filtration or centrifugation and is washed with a solvent, such as a liquid aliphatic hydrocarbon solvent and possibly dried.

In step (v) of the process the titanated support is put in contact with a Lewis base, to obtain the solid component of catalyst. Lewis bases (or internal electron donors) which can be used are ethers, amines, esters, alcoholates, silanic compounds, ketones and phosphoramides. The esters used can be of an organic or inorganic nature. Particularly suitable for the purpose are aromatic esters such as diisobutylphthalate, the alkyl esters of benzoic acid, p-methoxybenzoic acid and p-toluic acid, and aliphatic esters such as diethyl carbonate, ethyl pivalate, ethyl acetate and dimethyl maleate. Other compounds which can be used for the purpose are alkyl aryl silanes and alkoxysilanes. In the preferred form of practice, titanium tetrachloride is used as solvent and the molar ratio between the Lewis base and magnesium compound ranges from 0.1:1 to 0.3:1, at a temperature of about 90° C., for a period of about 1 hour.

In a particular embodiment the Lewis base is added partially at the end of step (i) of the procedure and partially in step (v). In any case the solid component of catalyst is obtained and is recovered in step (vi) of the procedure, washed with a hydrocarbon solvent and possibly dried.

The component of catalyst according to the present invention contains silica, magnesium, halogen (preferably chlorine), titanium and a Lewis base and typically 4–8% by weight of magnesium, 10–35% by weight of chlorine, 3–7% by weight of titanium and 1–15% by weight of the Lewis base, wherein the titanium is partly in a trivalent state (5–10%) and the remaining part in a tetravalent state. Expressed as molar ratios:

$$Mg_{(1)}Cl_{(1.5-4)}Ti_{(0.1-0.5)}LB_{(0.01-0.1)}$$

wherein LB=Lewis base.

This solid component of catalyst has a low molar ratio between chlorine and magnesium and, in the polymerization of propylene and other α-olefins, it enables to obtain polymers with an extremely reduced content of chlorine and typically lower than 20 ppm. In addition using this component, it is possible to obtain a polymer with a good morphology in terms of particle form (roundish) size and distribution and without fines.

The present invention also relates to a catalyst for the stereospecific polymerization of propylene and other α-olefins which is formed: (A) of the solid component of catalyst described above; (B) of an aluminium trialkyl or aluminium alkyl halide; and (C) of an electron donor compound, capable of forming a complex-compound with component (B).

Component (B) of the catalyst is conveniently selected from aluminium trialkyls and the halides (especially chlorides) of aluminium alkyl, which contain from 1 to 6 carbon atoms in the alkyl portion. Among these aluminium trialkyls, such as aluminium triethyl, aluminium tributyl, aluminium triisobutyl and aluminium trihexyl are preferred.

Component (C) of the catalyst is conveniently selected from alkoxy silanes defined with the formula $R^1R^2Si(OR^3)(OR^4g)$ wherein $R^1$ and $R^2$ are phenyl groups and $R^3$ and $R^4$ are $C_1$-$C_4$ alkyl groups. A specific example of component (C) is dimethoxy diphenyl silane.

In the catalysts of the present invention the atomic ratio between aluminium (present in component (B) and titanium (present in component (A)), may generally vary from 10/1 to 1,000/1 and is preferably within the range of 50/1 to 150/1. In addition the molar ratio between components (B) and (C) may generally vary from 5/1 to 20/1 and is preferably about 10/1.

The catalyst of the present invention is highly active in processes for the polymerization of propylene and other α-olefins to polymers which are highly stereospecific and which have high values of the flexural modulus. In particular in the polymerization of propylene, polypropylenes are obtained with an isotactic index of about 95%. Examples of other α-olefins which can be polymerized using the catalyst of the present invention are butene-1, 4-methyl-pentene-1 and hexene-1.

The polymerization reaction can be carried out with the suspension technique in an inert diluent, with the technique in loop reactors without solvents or diluents, or with the technique in gas phase. The polymerization can generally be carried out at a temperature ranging from room temperature to 120° C. and under a pressure of 1 to 100 atmospheres.

In any case using the catalyst of the present invention olefinic polymers are obtained with a particle size which is a precise replica of the solid component used. In this way it is possible to produce polymers having the desired particle size based on the selection of the size and size-distribution of the support.

The experimental examples which follow provide a better illustration of the invention. In these examples a non-treated silica was used, in microspheroidal form, having a $SiO_2$ content of 99.5% by weight, a surface area (BET) of 320 m²/g, pore volume of 1.6 ml/g, pore diameter of 25 nm, a particle size distribution of 20–50 μm.

In the examples of the invention this silica was blocked by reaction with tin tetrachloride operating in the following way.

200 g of silica having the characteristics specified above and 90 ml of anhydrous n-heptane are charged in a nitrogen atmosphere into a 250 ml flask equipped with a reflux cooler, mechanical stirrer and thermometer. The suspension is cooled to −20° C. and 50 ml of tin tetrachloride (426.1 mmoles) are added dropwise. The mixture is left to react for 1 hour at −20° C. under stirring. The temperature is brought to 0° C. and the mixture is left to react for 1 hour, it is then heated to room temperature and left to react for a further hour. The liquid is siphoned, the solid is throughly washed with n-hexane and n-pentane and dried. 21.7 g of blocked silica are thus obtained with an apparent density of about 0.21 g/ml.

EXAMPLE 1

20 g of blocked silica having the characteristics described above, 100 ml of anhydrous n-heptane and 140 ml of a 20% by weight solution in n-heptane of magnesium butyl octyl (20.4 g, 122.5 mmoles; $Mg_1But_{1.5}Oct_{0.5}$) are charged, in a nitrogen atmosphere, into a 500 ml flask equipped with a reflux cooler, mechanical stirrer and thermometer. The mixture is left to react for 30 minutes at room temperature. The suspension is cooled to −20° C. and 14.4 ml of tin tetrachloride (122.5 mmoles) are added. The temperature is brought to 20° C., the mixture is then left to react at 70° C. for 1 hour, is cooled to 30° C. and the liquid siphoned. 100 ml of anhydrous n-heptane are added to the solid and the suspension is cooled to −20° C. A further 14.4 ml (122.5 mmoles) of tin tetrachloride are added. The temperature is brought to 20° C. and the suspension is left to react at 70° C. for 1 hour. The solid is thoroughly washed with n-hexane and n-pentane at room temperature and dried by the evaporation of the solvent. 466 ml of titanium tetrachloride are added at room temperature to the solid thus obtained and the resulting suspension is slowly heated to 90° C. When this temperature has been reached 3.9 ml of diisobutyl phthalate (DIBP) are added dropwise. The following ratios between the reagents are maintained in the reaction: Mg:Ti:DIBP 1:34.5:0.12. The suspension is maintained for 2 hours at 90° C. The liquid is then siphoned under heat and the treatment is repeated with 330 ml of titanium tetrachloride, maintaining the suspension at 90° C. for 1 hour. The liquid is siphoned under heat, the solid is washed with warm n-heptane, is cooled, thoroughly washed with n-pentane and dried.

22.9 g of an ecru-coloured solid component in granules are thus obtained with an apparent density of about 0.29 g/ml, containing 7.14% by weight of magnesium, 30.27% by weight of chlorine, 4.49% by weight of titanium, of which 9.2% is in trivalent form.

The solid component of catalyst prepared as described above, is used in a test for the polymerization of propylene. More specifically, the polymerization is carried out operating in a 5 litre volume autoclave, equipped with a magnetic stirrer and electrically heated. After cleansing with a nitrogen flow for 2 hours at 115° C., the autoclave is cooled to room temperature and fed with about 2 litres of n-hexane, and heated under stirring to 40° C.

At this point the catalyst to be introduced is prepared as follows:

100 mg of the solid component are transferred, in an inert atmosphere, to a tailed flask with a capacity of 200 ml, and suspended in 100 ml of n-hexane;

9.4 mmoles of aluminium triethyl and 0.94 mmoles of dimethoxy diphenyl silane diluted in n-hexane are placed in a separating funnel above, connected to the flask;

a quantity, equal to about 20% by volume of the total, of the solution contained in the separating funnel, is fed into the tailed flask below;

at this point the mixture contained in the tailed flask and, subsequently, the remaining part of the solution containing the aluminium triethyl and dimethoxy diphenyl silane are fed into the autoclave.

Hydrogen and propylene in pre-established quantities are then fed into the autoclave. The autoclave is heated to polymerization temperature. At the end of the polymerization the polymeric suspension obtained in a mixture acetone-ethyl alcohol (volume ratio 2:1) coagulates. The polymer is filtered and dried in an oven at 60° C.

The polymerization is carried out at 70° C., at a total pressure of 15 bar and for a period of 3 hours, using about 300 normal-ml of hydrogen as molecular weight regulator.

A yield is obtained equal to 4.84 kg of polypropylene per gram of solid component of catalyst and the polypropylene thus obtained has the following characteristics:

| | |
|---|---|
| MFI (5 kg; 230° C.): | 5.44 g/10' |
| (Melt-Flow Index -ASTM D 1238 L) | |
| apparent density: | 0.41 g/ml |
| II: | 93% |
| (isotactic index, determined by the extraction of the atactic part in heptane at reflux temperature for 24 hours). | |

The polypropylene is also in the form of granules with the following size distribution in $\mu$m:

| | |
|---|---|
| >2000 | 2.1% by weight |
| 2000< >1000 | 15.8% by weight |
| 1000< >500 | 59.7% by weight |
| 500< >250 | 14.5% by weight |
| 250< >125 | 4.9% by weight |
| 125< >63 | 2.0% by weight |
| <63 | 1.0% by weight. |

EXAMPLE 2

10 g of blocked silica having the characteristics described above, 50 ml of anhydrous n-heptane and 70 ml of a 20% by weight solution in n-heptane of magnesium butyl octyl (10.2 g, 61.3 mmoles; $Mg_1But_{1.5}Oct_{0.5}$) are fed, in a nitrogen atmosphere, into a 500 ml flask equipped with a reflux cooler, mechanical stirrer and thermometer. The mixture is left to react for 30 minutes at room temperature. The suspension is cooled to $-20°$ C. and 3.6 ml of tin tetrachloride (30.7 mmoles) are added. The temperature is brought to 20° C., the mixture is then left to react at 70° C. for 1 hour, is cooled to 30° C. and the liquid siphoned. 50 ml of anhydrous n-heptane are added to the solid and the suspension is cooled to $-20°$ C. A further 3.6 ml (30.7 mmoles) of tin tetrachloride are added. The temperature is brought to 20° C. and the suspension is left to react at 70° C. for 1 hour. The solid is thoroughly washed with n-hexane and n-pentane at room temperature and dried by evaporation of the solvent. 233 ml of titanium tetrachloride are added at room temperature to the solid thus obtained and the resulting suspension is slowly heated to 90° C. When this temperature has been reached 2 ml of diisobutyl phthalate (DIBP) are added dropwise. The following ratios between the reagents are maintained in the reaction: Mg:Ti:DIBP 1:34.5:0.12. The suspension is maintained for 2 hours at 90° C. The liquid is then siphoned under heat and the treatment is repeated with 180 ml of titanium tetrachloride, maintaining the suspension at 90° C. for 1 hour. The liquid is siphoned under heat, the solid is washed with warm n-heptane, is cooled, thoroughly washed with n-pentane and dried.

10.1 g of an ecru-coloured solid component in granules are thus obtained with an apparent density of about 0.27 g/ml, containing 6.04% by weight of magnesium, 28.82% by weight of chlorine, 4.95% by weight of titanium, of which 6.4% is in trivalent form.

The solid component of catalyst prepared as described above, is used in a test for the polymerization of propylene. More specifically, the polymerization is carried out, using same procedure as in Example 1, at a temperature of 70° C., at a total pressure of 15 bar and for a period of 3 hours, using hydrogen as molecular weight regulator.

A yield is obtained equal to 3.8 kg of polypropylene per gram of solid component of catalyst and the polypropylene thus obtained has the following characteristics:

| | |
|---|---|
| MFI (5 kg; 230° C.): | 3.3 g/10' |
| apparent density: | 0.40 g/ml |
| II: | 95% |

The polypropylene is also in the form of granules with the following size distribution in $\mu$m:

| | |
|---|---|
| >2000 | 0.4% by weight |
| 2000< >1000 | 10.6% by weight |
| 1000< >500 | 59.5% by weight |
| 500< >250 | 15.6% by weight |
| 250< >125 | 7.5% by weight |
| 125< >63 | 4.2% by weight |
| <63 | 2.2% by weight. |

EXAMPLE 3

11 g of blocked silica having the characteristics described above, 50 ml of anhydrous n-heptane and 70 ml of a 20% by weight solution in n-heptane of magnesium butyl octyl (10.2 g, 61.3 mmoles; $Mg_1But_{1.5}Oct_{0.5}$) are charged, in a nitrogen atmosphere, into a 500 ml flask equipped with a reflux cooler, mechanical stirrer and thermometer. The mixture is left to react for 30 minutes at room temperature. At this point 2.0 ml of diisobutyl phthalate (DIBP) are added and the mixture is left to react at room temperature. 140 ml of silicon tetrachloride (1222 mmoles) are added. The mixture is left to react at 65° C. for 1 hour, is cooled to 30° C. and the liquid siphoned. t at 70° C. for 1 hour, is cooled to 30° C. and the liquid siphoned. The solid is thoroughly washed with n-hexane and n-pentane at room temperature and dried by the evaporation of the solvent. 204 ml of titanium tetrachloride are added at room temperature to 16.3 of the solid thus obtained and the resulting suspension is slowly heated to 90° C. When this temperature has been reached 1.7 ml of diisobutyl phthalate (DIBP) are added dropwise. The following ratios between the reagents are maintained in the reaction: Mg:Ti:DIBP 1:34.5:0.12. The suspension is maintained for 2 hours at 90° C. The liquid is then siphoned under heat and the treatment is repeated with 180 ml of titanium tetrachloride, maintaining the suspension at 90° C. for 1 hour. The liquid is siphoned under heat, the solid is washed with warm n-heptane, is cooled, thoroughly washed with n-pentane and dried.

16.6 g of a light-green coloured solid component in granules are thus obtained with an apparent density of about 0.37 g/ml, containing 6.37% by weight of magnesium, 28.85% by weight of chlorine, 4.34% by weight of titanium, of which 8.2% is in trivalent form.

The solid component of catalyst prepared as described above, is used in a test for the polymerization of propylene. More specifically, the polymerization is carried out, using the same procedure as in Example 1, at a temperature of 70° C., at a total pressure of 15 bar and for a period of 3 hours, using hydrogen as molecular weight regulator.

A yield is obtained equal to 7.7 kg of polypropylene per gram of solid component of catalyst and the polypropylene thus obtained has the following characteristics:

| MFI (5 kg; 230° C.): | 8.4 g/10' |
|---|---|
| apparent density: | 0.43 g/ml |
| II: | 94.3% |

The polypropylene is also in the form of granules with the following size distribution in $\mu m$:

| >2000 | 0.2% by weight |
|---|---|
| 2000< >1000 | 53.9% by weight |
| 1000< >500 | 43.0% by weight |
| 500< >250 | 2.9% by weight |
| 250< >125 | 0.0% by weight |
| 125< >63 | 0.0% by weight |
| <63 | 0.0% by weight. |

EXAMPLE 4

10 g of blocked silica having the characteristics described above, 50 ml of anhydrous n-heptane and 70 ml of a 20% by weight solution in n-heptane of magnesium butyl octyl (10.2 g, 61.3 mmoles; $Mg_1But_{1.5}Oct_{0.5}$) are fed, in a nitrogen atmosphere, into a 500 ml flask equipped with a reflux cooler, mechanical stirrer and thermometer. The mixture is left to react for 30 minutes at room temperature. 2.0 ml of diisobutyl phthalate (DIBP) are added to this suspension dropwise and stirring is maintained for 1 hour. The suspension is cooled to −20° C. and 7.2 ml of tin tetrachloride (61.3 mmoles) are added. The suspension is left to react at 70° C. for 1 hour, is cooled to 30° C. and the liquid siphoned. The suspension is cooled again to −20° C. and a further 7.2 ml of tin tetrachloride are added. The suspension is left to react at 70° C. for 1 hour, the temperature is brought to 30° C., and the liquid is siphoned. The solid is thoroughly washed with n-hexane and n-pentane at room temperature and dried by the evaporation of the solvent. 185 ml of titanium tetrachloride are added at room temperature to the solid thus obtained and the resulting suspension is slowly heated to 90° C. When this temperature has been reached 1.6 ml of diisobutyl phthalate (DIBP) are added dropwise. The following ratios between the reagents are maintained in the reaction: Mg:Ti:DIBP 1:35.1:0.12. The suspension is maintained for 2 hours at 90° C. The liquid is then siphoned under heat and the treatment is repeated with 130 ml of titanium tetrachloride, maintaining the suspension at 90° C. for 1 hour. The liquid is siphoned under heat, the solid is washed with warm n-heptane, is cooled, thoroughly washed with n-pentane and dried.

15.9 g of a light grayish-green coloured solid component in granules are thus obtained with an apparent density of about 0.40 g/ml, containing 7.08% by weight of magnesium, 15.49% by weight of chlorine, 4.74% by weight of titanium, of which 6.9% is in trivalent form.

The solid component of catalyst prepared as described above, is used in a test for the polymerization of propylene. More specifically, the polymerization is carried out, using same procedure as in Example 1, at a temperature of 70° C., at a total pressure of 15 bar and for a period of 3 hours, using hydrogen as molecular weight regulator.

A yield is obtained equal to 8.9 kg of polypropylene per gram of solid component of catalyst and the polypropylene thus obtained has the following characteristics:

| MFI (5 kg; 230° C.): | 10.4 g/10' |
|---|---|
| apparent density: | 0.35 g/ml |
| II: | 95.2% |

The polypropylene is also in the form of granules with the following size distribution in $\mu m$:

| >2000 | 9.6% by weight |
|---|---|
| 2000< >1000 | 43.8% by weight |
| 1000< >500 | 40.6% by weight |
| 500< >250 | 5.3% by weight |
| 250< >125 | 0.6% by weight |
| 125< >63 | 0.1% by weight |
| <63 | 0.0% by weight. |

EXAMPLE 5

The same catalyst as example 4 is used in a further test for the polymerization of propylene and more specifically, the same procedure is used as in example 1, at a temperature of 85° C., at a total pressure of 15 bar and for a period of 3 hours, using hydrogen as molecular weight regulator.

A yield is obtained equal to 9.2 kg of polypropylene per gram of solid component of catalyst and the polypropylene thus obtained has the following characteristics:

| MFI (5 kg; 230° C.): | 9.5 g/10' |
|---|---|
| apparent density: | 0.38 g/ml |
| II: | 91.6% |

The polypropylene is also in the form of granules with the following size distribution in $\mu m$:

| >2000 | 12.8% by weight |
|---|---|
| 2000< >1000 | 50.6% by weight |
| 1000< >500 | 34.5% by weight |
| 500< >250 | 1.8% by weight |
| 250< >125 | 0.2% by weight |
| 125< >63 | 0.1% by weight |
| <63 | 0.0% by weight. |

Furthermore the polypropylene thus obtained has a flexural modulus of 275.000 psi with an HI200 of 20 J/m.

EXAMPLE 6 (Comparative)

20 g of non-blocked silica having the characteristics specified in the description, 100 ml of anhydrous n-heptane and 140 ml of silicon tetrachloride (1.222 mmoles) are charged, in a nitrogen atmosphere, into a 1000 ml flask equipped with a reflux cooler, mechanical stirrer and thermometer. The mixture is left to react at reflux temperature (67°–69° C.) for 1 hour, is cooled to 30° C. and the liquid siphoned. 140 ml of a 20% by weight solution of magnesium butyl octyl in n-heptane ($Mg_1But_{1.5}Oct_{0.5}$; 20.4 g, 122.5 mmoles) are added. The suspension is left to react for 30 minutes at room temperature and the dense overflowing liquid phase is siphoned. A further 140 ml of silicon tetrachloride are added to the solid. The mixture is left to react at reflux temperature (65° C.) for 1 hour, the temperature is then brought to 30° C. The solid is thoroughly washed with n-hexane and n-pentane at room temperature and dried by the evaporation of the solvent.

466 ml of titanium tetrachloride are added at room temperature to the solid thus obtained and the resulting suspension is slowly heated to 90° C. When this temperature has been reached 3.9 ml (14.7 mmoles) of diisobutyl phthalate (DIBP) are added dropwise. The following ratios between the reagents are maintained in the reaction: Mg:Ti:DIBP 1:35.1:0.12. The suspension is maintained for 2 hours at 90° C. The liquid is then siphoned under heat and the treatment is repeated with 390 ml of titanium tetrachloride, maintaining the suspension at 90° C. for 1 hour. The liquid is siphoned under heat, the solid is cooled, thoroughly washed with n-pentane and dried.

15.7 g of a beige-coloured solid component in granules are thus obtained with an apparent density of about 0.28 g/ml, containing 4.48% by weight of magnesium, 17.97% by weight of chlorine, 1.89% by weight of titanium, of which 12% is in trivalent form.

The solid component of catalyst prepared as described above, is used in a test for the polymerization of propylene. More specifically, the polymerization is carried out, using same procedure as in Example 1, at a temperature of 70° C., at a total pressure of 15 bar and for a period of 3 hours, using hydrogen as molecular weight regulator.

A yield is obtained equal to 1.4 kg of polypropylene per gram of solid component of catalyst and the polypropylene thus obtained has the following characteristics:

| | |
|---|---|
| MFI (5 kg; 230° C.): | 5.7 g/10' |
| apparent density: | 0.40 g/ml |
| II: | 79% |

The polypropylene is also in the form of granules with the following size distribution in μm:

| | |
|---|---|
| >2000 | 0.0% by weight |
| 2000< >1000 | 1.0% by weight |
| 1000< >500 | 73.0% by weight |
| 500< >250 | 24.3% by weight |
| 250< >125 | 1.7% by weight |
| 125< >63 | 0.0% by weight |
| <63 | 0.0% by weight. |

EXAMPLE 7 (Comparative)

20 g of non-blocked silica having the characteristics specified in the description, 200 ml of anhydrous n-heptane and 140 ml of silicon tetrachloride (1.222 mmoles) are charged, in a nitrogen atmosphere, into a 500 ml flask equipped with a reflux cooler, mechanical stirrer and thermometer. The mixture is left to react at reflux temperature (70°–73° C.) for 1 hour, is cooled to 30° C. and the liquid siphoned. 140 ml of a 20% by weight solution of magnesium butyl octyl in n-heptane ($Mg_1But_{1.5}Oct_{0.5}$; 20.4 g, 122.5 mmoles) are added. The suspension is left to react for 30 minutes at room temperature and is left to rest for 1.5 hours to permit sedimentation. The overflowing liquid phase is siphoned and the solid is thoroughly washed with n-hexane and n-pentane at room temperature and dried by the evaporation of the solvent.

80.7 ml of titanium tetrachloride are added at room temperature to 31.7 g of the solid thus obtained and the resulting suspension is slowly heated to 90° C. When this temperature has been reached 1.55 ml of diisobutyl phthalate (DIBP) are added dropwise. The following ratios between the reagents are maintained in the reaction: Mg:Ti:DIBP 1:15:0.12. The suspension is maintained for 2 hours at 90° C. The liquid is then siphoned under heat and the treatment is repeated with 100 ml of titanium tetrachloride, maintaining the suspension at 90° C. for 1 hour. The liquid is siphoned under heat, is cooled, washed with warm n-heptane, cooled, thoroughly washed with n-pentane and dried.

33.3 g of a beige-coloured solid component in granules are thus obtained with an apparent density of about 0.40 g/ml, containing 3.21% by weight of magnesium, 22.66% by weight of chlorine, 5.07% by weight of titanium, of which 14.6% is in trivalent form.

The solid component of catalyst prepared as described above, is used in a test for the polymerization of propylene. More specifically, the polymerization is carried out, using same procedure as in Example 1, at a temperature of 70° C., at a total pressure of 15 bar and for a period of 3 hours, using hydrogen as molecular weight regulator.

A yield is obtained equal to 1.88 kg of polypropylene per gram of solid component of catalyst and the polypropylene thus obtained has the following characteristics:

| | |
|---|---|
| MFI (5 kg; 230° C.): | 27.1 g/10' |
| apparent density: | 0.36 g/ml |
| II: | 82.4% |

The polypropylene is also in the form of granules with the following size distribution in μm:

| | |
|---|---|
| >2000 | 0.5% by weight |
| 2000< >1000 | 5.7% by weight |
| 1000< >500 | 63.6% by weight |
| 500< >250 | 27.7% by weight |
| 250< >125 | 2.5% by weight |
| 125< >63 | 0.0% by weight |
| <63 | 0.0% by weight. |

EXAMPLE 8 (Comparative)

20 g of non-blocked silica having the characteristics specified in the description, 90 ml of anhydrous n-heptane are charged, in a nitrogen atmosphere, into a 250 ml flask equipped with a reflux cooler, mechanical stirrer and thermometer. The mixture is cooled to $-20°$ C. and 45 ml of antimonium pentachloride are added dropwise. The mixture is kept for 1 hour at $-20°$ C., for 1 hour at $0°$ C. and for 1 hour at room temperature, under continual stirring. The overflowing liquid phase is siphoned and the solid is washed with n-hexane and n-pentane and then dried. 50 ml of n-heptane and 35 ml of a 20% by weight solution of magnesium butyl octyl in n-heptane ($Mg_1But_{1.5}Oct_{0.5}$; 5.1 g, 30.63 mmoles) are added to 21 g of the solid thus obtained. The suspension is left to react for 30 minutes at room temperature. 1 ml (3.77 mmoles) of diisobutyl phthalate (DIBP) are added to the resulting suspension and the suspension is left to react at room temperature for 30 minutes. 70 ml (611 mmoles) of silicon tetrachloride are added, the mixture is left to react at reflux temperature for 1 hour, is cooled to $30°$ C. and the liquid siphoned. 116 ml of titanium tetrachloride are added at room temperature to the solid thus obtained and the resulting suspension is slowly heated to $90°$ C. When this temperature has been reached 1 ml of diisobutyl phthalate (DIBP) are added dropwise. The following ratios between the reagents are maintained in the reaction: Mg:Ti:DIBP 1:34.3:0.12. The suspension is maintained for 2 hours at $90°$ C. The liquid is then siphoned under heat and the treatment is repeated with 96 ml of titanium tetrachloride, maintaining the suspension at $90°$ C. for 1 hour. The liquid is siphoned, is cooled, washed with warm n-heptane, cooled, thoroughly washed with n-pentane and dried.

10.7 g of a dark brown-coloured solid component in granules are thus obtained with an apparent density of about 0.32 g/ml, containing 3.06% by weight of magnesium, 36.94% by weight of chlorine, 10.24% by weight of titanium, of which 49.8% is in trivalent form.

The solid component of catalyst prepared as described above, is used in a test for the polymerization of propylene. More specifically, the polymerization is carried out, using same procedure as in Example 1, at a temperature of $70°$ C., at a total pressure of 15 bar and for a period of 3 hours, using hydrogen as molecular weight regulator.

A yield is obtained equal to 0.5 kg of polypropylene per gram of solid component of catalyst and the polypropylene thus obtained has the following characteristics:

| MFI (5 kg; 230° C.): | 11.3 g/10' |
|---|---|
| apparent density: | not determinable |
| II: | 65.1% |

We claim:

1. Process for the preparation of a solid component of catalyst, active in the polymerization of propylene and other α-olefins in stereoregular polymers, said solid component containing silica, magnesium, halogen, titanium and a Lewis base, said process comprising:

(i) treating a non-activated particulate silica support, by contacting said silica with a solution, in an inert hydrocarbon solvent, of a tin tetrahalide, operating with a weight ratio between the tin tetrahalide and the silica of between 1:1 and 20:1, at a temperature ranging from $-30°$ C. to $30°$ C., for a time which is sufficient to at least partially block the hydroxylic groups of the silica, to obtain a blocked silica;

impregnating said blocked silica with a solution, in an inert hydrocarbon solvent, of a magnesium dialkyl or magnesium alkyl halide, operating with a weight ratio between the magnesium compound and the blocked silica of between 0.1:1 and 10:1, at a temperature ranging from $20°$ C. to the boiling point of the liquid phase, for a time which is sufficient to interact the magnesium compound with the tin compound and with any possible residual hydroxylic groups of the silica, to obtain a support;

(iii) halogenating said support by contacting said support with a solution, in an inert hydrocarbon solvent, of a halogenating agent selected from the halides of tin, antimony or silicon, operating with a molar ratio between the halogenating agent and the magnesium compound introduced in step (ii) ranging from 0.1:1 to 100:1, at a temperature ranging from $-20°$ to $100°$ C. and for a period of 0.5 to 5.0 hours, to obtain a halogenated support;

(iv) titanating said halogenated support by contacting said halogenated support with an excess of a titanium tetrahalide, in the form of either a liquid or as a solution in an inert hydrocarbon solvent, operating at a temperature ranging from $20°$ to $120°$ C. and for a period of 0.5 to 5.0 hours, to obtain a titanated support;

(v) contacting said titanated support with a Lewis base, in the from of either a liquid or as a solution in an inert hydrocarbon solvent, operating with a molar ratio between said Lewis base and the magnesium compound introduced in step (ii) ranging from 0.05:1 to 0.5:1, at a temperature ranging from $80°$ to $120°$ C. and for a period of 0.5 to 5.0 hours, to obtain a solid component of catalyst; and (vi) recovering said solid component of catalyst from the reaction products of step (v).

2. Process according to claim 1, characterized in that said silica used in step (i) is a microspheroidal, porous silica, with a particle size ranging from 20 to 100 μm, with a surface area of 150 to 400 m$^2$/g, with a pore volume of 1.3 to 1.8 ml/g and with an average pore diameter of 20 to 30 A (angstrom), containing hydroxyls and water in a total quantity which is higher than 1% by weight up to a maximum value of about 5% by weight.

3. Process according to claim 1, characterized in that in step (i) tin tetrachloride is used, operating with a solvent selected from pentane, isopentane, hexane, heptane and octane, at a temperature increasing from about $-20°$ C. to room temperature ($20°-25°$ C.), for a period of 1 to 3 hours.

4. Process according to claim 1, characterized in that in step (ii) a magnesium compound is used having either one of the formulae MgRR' or MgR"X, wherein R, R' and R" each independently represent an alkyl group, linear or branched, containing from 1 to 12 carbon atoms and X represents a halogen atom.

5. Process according to claim 4 characterized in that in step (ii) is carried out in a hydrocarbon solvent selected from the group consisting of pentane, isopentane, hexane, heptane and octane, with a weight ratio between the magnesium compound and silica ranging from 0.2:1 to 2.0:1, and preferably within the range of 1.0:1–1.5:1, at a temperature equal or close to room temperature ($20°-25°$ C.) and for a period of 0.5 hours.

6. Process according to claim 1, characterized in that in step (iii) the halogenating agent is selected from tin tetrachloride, antimonium pentachloride and silicon tetrachloride, operating in a solvent selected from pentane, isopentane, hexane, heptane and octane, with a molar ratio between the halogenating agent and magnesium compound ranging from 1:1 to 20:1 and for a period of 1-2 hours.

7. Process according to claim 1, characterized in that the reaction temperature ranges from −30° to 70° C. when the halogenating agent is a tin or antimonium halide, and from 40° to 100° C. when the halogenating agent is a silicon halide.

8. Process according to claim 1, characterized in that step (iv) is carried out with titanium tetrachloride, at a temperature ranging from 80° to 100° C. and for a period of 1-2 hours, to obtain a titanated support containing from 3 to 7% by weight of titanium.

9. Process according to claim 1, characterized in that in step (v) the Lewis base is selected from aromatic esters, alkyl esters of benzoic acid, p-methoxybenzoic acid and p-toluic acid, aliphatic esters, alkyl aryl silanes and alkoxysilanes, operating in a solvent selected from pentane, isopentane, hexane, heptane and octane, with a molar ratio between the Lewis base and magnesium compound ranging from 0.1:1 to 0.3:1, at a temperature of about 90° C., for a period of about 1 hour.

10. Process according to claim 9, characterized in that said Lewis base is selected from diisobutylphthalate, diethyl carbonate, ethyl pivalate, ethyl acetate and dimethyl maleate.

11. A solid component of catalyst produced according to the process of claim 1.

12. Catalyst for the stereospecific polymerization of propylene and other α-olefins formed of: (A) a solid component of catalyst according to claim 11, wherein said solid component contains silica, 4-8% by weight of magnesium, 10-35% by weight of chlorine, 3-7% by weight of titanium and 1-15% by weight of a Lewis base, wherein 5-10% of the titanium is in a trivalent state and the remaining part is in a tetravalent state (B) an aluminum trialkyl or aluminium alkyl halide and (C) an electron donor compound capable of forming a complex compound with component (B).

13. Catalyst according to claim 12, characterized in that component (B) is selected from aluminium triethyl, aluminium tributyl, aluminium triisobutyl and aluminium trihexyl and component (C) is selected from alkoxy silanes defined with the formula $R^1R^2Si(OR^3)(OR^4)$ wherein $R^1$ and $R^2$ are phenyl groups and $R^3$ and $R^4$ are $C_1$-$C_4$ alkyl groups, the atomic ratio between the aluminium, present in component (B) and the titanium, present in component (A), varying from 10/1 to 1000/1 and the molar ratio between components (B) and (C) varying from 5/1 to 20/1.

14. A process according to claim 4, wherein the halogen is chlorine.

15. A process according to claim 4, wherein the magnesium compound is selected from magnesium diethyl, magnesium ethylbutyl, magnesium dihexyl, magnesium butyloctyl and magnesium dioctyl.

16. A process according to claim 5, wherein the weight ratio between the magnesium compound and silica is within the range of 1.0:1-1.5:1.

17. A catalyst according to claim 13, wherein the siloxane is dimethoxy diphenyl silane.

18. A catalyst according to claim 13, wherein the atomic ratio between the aluminum and the titanium is from 50/1 to 150/1.

19. A catalyst according to claim 13, wherein the molar ratio between components (B) and (C) is about 10/1.

20. A solid component of catalyst according to claim 11, comprising silica, 4-8% by weight of magnesium, 10-35% by weight of chlorine, 3-7% by weight of titanium and 1-15% by weight of a Lewis base, wherein 5-10% of the titanium is in a trivalent state and the remaining part of the titanium is in a tetravalent state.

* * * * *

UNITED STATES PATENT AND TRADEMARK OFFICE
CERTIFICATE OF CORRECTION

PATENT NO.  : 5,348,925
DATED       : September 20, 1994
INVENTOR(S) : Federico Milani, et. al.

It is certified that error appears in the above-indentified patent and that said Letters Patent is hereby corrected as shown below:

Column 14, line 3, Claim 1, before the word "impregnating" insert --(ii)--.
Column 14, line 31, Claim 1, "from" should read --form--.
Column 16, line 9, Claim 13, "$R^1R^2Si(OR^3)(OR^4)$" should read -- $R^1R^2Si-(OR^3)(OR^4)$ --.

Signed and Sealed this

Third Day of January, 1995

Attest:

*Attesting Officer*

BRUCE LEHMAN

*Commissioner of Patents and Trademarks*